United States Patent
Balavendra Raj et al.

(10) Patent No.: US 12,518,630 B2
(45) Date of Patent: Jan. 6, 2026

(54) PARAMETERIZATION OF A COLLISION OF A VEHICLE

(71) Applicant: ZF Friedrichshafen AG, Friedrichshafen (DE)

(72) Inventors: Arun Muthu Balavendra Raj, Ingolstadt (DE); Wolfgang Kampe, Ingolstadt (DE); Bernhard Grotz, Fellbach (DE); Kilian Hachmann, Wettstetten (DE); Jürgen Metzger, Meersburg (DE); Philipp Straßburger, Eriskirch (DE); Parthasarathy Nadarajan, Ravensburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 169 days.

(21) Appl. No.: 18/481,445

(22) Filed: Oct. 5, 2023

(65) Prior Publication Data
US 2024/0119838 A1 Apr. 11, 2024

(30) Foreign Application Priority Data
Oct. 6, 2022 (DE) .......................... 102022210567.2

(51) Int. Cl.
*G08G 1/16* (2006.01)
*B60W 30/08* (2012.01)
*G07C 5/08* (2006.01)

(52) U.S. Cl.
CPC ............. *G08G 1/162* (2013.01); *B60W 30/08* (2013.01); *G07C 5/0808* (2013.01)

(58) Field of Classification Search
CPC ......... G08G 1/16; G08G 1/162; B60W 30/08; B60W 30/095; B60W 50/00; G07C 5/0808
See application file for complete search history.

(56) References Cited

U.S. PATENT DOCUMENTS

| | | | |
|---|---|---|---|
| 2004/0019420 A1* | 1/2004 | Rao | B60R 21/0134 701/45 |
| 2004/0193347 A1* | 9/2004 | Harumoto | G08G 1/166 701/45 |

(Continued)

FOREIGN PATENT DOCUMENTS

| | | |
|---|---|---|
| DE | 102005002760 A1 | 8/2005 |
| DE | 102018206751 A1 | 11/2019 |
| WO | WO 2019/137864 A1 | 7/2019 |

OTHER PUBLICATIONS

German Office Action in Corresponding German Application No. DE 10 2022 210 567.2, dated May 23, 2023 (12 pages).

(Continued)

*Primary Examiner* — Tan Q Nguyen
(74) *Attorney, Agent, or Firm* — Crowell & Moring LLP (57) ABSTRACT

A method for parameterization of a vehicle collision includes obtaining a first outline of a first vehicle; obtaining a second outline of a second object participating in the collision with the first vehicle; modeling a collision between the first vehicle and the second object on the basis of the relative movement of the first and second outlines, wherein in the relative movement, the first and second outlines overlap at least along part of the relative movement; determining the parameterization on the basis of the overlapping extent of the outlines.

19 Claims, 5 Drawing Sheets

(56) References Cited

U.S. PATENT DOCUMENTS

| | | | | |
|---|---|---|---|---|
| 2007/0282530 | A1* | 12/2007 | Meister | G08G 1/165 |
| | | | | 340/686.6 |
| 2008/0243389 | A1* | 10/2008 | Inoue | G08G 1/166 |
| | | | | 701/301 |
| 2012/0221211 | A1* | 8/2012 | Lich | B60R 21/0136 |
| | | | | 701/1 |
| 2015/0291159 | A1* | 10/2015 | Sasabuchi | G01S 13/867 |
| | | | | 701/1 |
| 2015/0298692 | A1* | 10/2015 | Minemura | B60W 30/0956 |
| | | | | 701/1 |
| 2016/0140266 | A1* | 5/2016 | Kang | G06F 30/20 |
| | | | | 703/1 |
| 2020/0139963 | A1 | 5/2020 | Kim | |
| 2021/0046940 | A1 | 2/2021 | Feser et al. | |
| 2021/0171063 | A1* | 6/2021 | Park | B60W 30/09 |
| 2021/0221403 | A1* | 7/2021 | Gyllenhammar | G05D 1/0276 |
| 2023/0124848 | A1* | 4/2023 | Nister | G06N 3/08 |
| | | | | 701/23 |

OTHER PUBLICATIONS

Müller, M., et al., "Real-Time Crash Severity Estimation with Machine Learning and 2D Mass-Spring-Damper Model" 2018 21$^{st}$ International Conference on Intelligent Transportation Systems (ITSC), 2018, pp. 2036-2043. IEEE Xplore (8 pages).

* cited by examiner

PARAMETERIZATION OF A COLLISION OF A VEHICLE

CROSS-REFERENCE TO RELATED APPLICATION

This application claims priority to German Application No. DE 10 2022 210 567.2, filed on Oct. 6, 2022, the entirety of which is hereby fully incorporated by reference herein.

FIELD

The present disclosure relates to a vehicle collision parameterization, in particular for controlling a collision avoidance system, also referred to as a pre-crash system or collision mitigation system.

BACKGROUND AND SUMMARY

When a vehicle is about to collide with another object, it is possible to estimate the potential consequences in advance. By way of example, the severity of the potential consequences can be rated according to a predefined scale. This severity can indicate the consequences to the health of the occupants of the vehicle. By way of example, the most severe injury sustained by an occupant of the vehicle can be expressed as the "Maximum Abbreviated Injury Scale" (MAIS). Other classification systems include the Occupant Load Criterion (OLC) and the Energy Equivalent Speed (EES).

This severity can be used to control the vehicle and/or the vehicle components, e.g. actuators, to mitigate the consequences of the collision. The vehicle can have a collision avoidance system (CAS) that controls certain actuators in order to minimize injury. A seatbelt can be tightened on a passenger, or a windows and the moonroof can be closed if an upcoming collision with a person outside the vehicle has been detected.

Complex physical processes take place during a collision, such that a model thereof can only be obtained taking numerous parameters into account that are not always readily available. The weight of an oncoming vehicle, or the sturdiness of the body thereof may not always be known. Moreover, complex models or simulations require substantial processing resources and time, which can increase costs and also limit the scope of applicability, in particular when time is a critical factor.

An object of the present disclosure is to simplify vehicle collision parameterization. This problem is solved by the subject matter of the independent claims. The dependent claims describe preferred embodiments.

The present disclosure is based on the idea that collision parameterization using a model showing how the outlines of the participants in the collision overlap provides a quick and sufficiently precise parameterization of a collision. This is analogous to how the moon appears to overlap the sun during an eclipse. The severity of a collision can be quickly and reliably determined without a comprehensive knowledge of the vehicular parameters with the geometrical approach proposed herein.

The present disclosure results in a parameterization method for a vehicle collision. The method comprises obtaining a first outline of a first vehicle, obtaining a second outline of the object the first vehicle is colliding with, and creating a model of a collision between the first vehicle and the other object based on the movement of the first outline in relation to the second outline. The first and second outlines overlap at least along part of the relative movement. The method also comprises parameterization based on the extent of the overlapping. Various approaches can be used to determine this overlapping extent.

The method can be carried out for the first vehicle and/or by a device in the first vehicle such as a dedicated processing unit. This determination can form a prognosis for a probable and/or possible future collision. The determination can be for a predefined time horizon, e.g. in the range of a few hundreds of milliseconds.

The method can be implemented in a computer, such that it is executed and/or controlled by a processing unit. The modeling of the movement of the outlines in relation to one another requires relatively little processing resources and can be carried out quickly, in realtime and/or on the basis of traffic and environmental monitoring.

The extent of overlapping can indicate how much the shapes of the vehicles overlap one another during the collision. A larger overlapping results in a higher overlapping extent. With small overlapping, this can mean that only a side mirror on a vehicle is damaged, for example. With greater overlapping, there is the possibility of injuring a vehicle occupant.

The extent of overlapping can be based on how much the lines overlap and/or how much overlapping area there is within the outlines. A line overlapping can be represented by a portion and/or overall length of the outlines, which overlap at a certain time while they are moving with respect to the first outline and/or second outline.

Area overlapping can correspond to a surface area within the first and/or second outline at a point in time during the relative movement. This overlapping and/or the progression thereof over time can be modeled geometrically, which results in a simple processing. The line overlapping and area overlapping can both be determined with respect to a specific plane in which the outlines of the vehicles are being monitored. This plane is preferably horizontal or vertical. The vertical plane can move with one of the vehicles horizontally.

In some variations, area overlapping and/or line overlapping can correspond to a portion of the overlapping areas and/or line lengths of the overall area and/or outline line length of one or both of the participants in the collision. In other words, the extent of overlapping can be absolute or relative in respect to one of the vehicles or its outline.

The extent of overlapping can also be based on how much the outlines are penetrated. This penetration can relate to the volume occupied by both vehicles during the collision. The overlapping volume can be absolute or it can be a portion of the overall volume of one of the vehicles or its outline.

The extent of overlapping can relate to a maximum overlapping and/or a change in the overlapping over time, such as a maximum change over time, and/or it can represent such an overlapping and/or change. The maximum overlapping can relate in particular to a maximum line overlapping and/or area overlapping, or a maximum penetration in the direction of the relative movement. A maximum overlapping can correspond to a specific point in time.

A change over time can take place at, and/or correspond to, one or more points in time. The time at which a maximum overlapping takes place can be one of the points in time that are monitored during the change, or it can be at some other point in time. This approach results in an efficient processing. An extent of overlapping can also take into account, and/or be based on, a one-dimensional projection, such as the width and/or length of an overlapping region or overlapping area, in relation to the overall width and/or overall length of one or both outlines, in particular the first outline. This allows for a rotational effect and/or biased load to be taken into account.

A maximum overlapping can be determined such that it indicates when a threshold for a maximum overlapping has been exceeded one or more times. In particular, a maximum overlapping can correspond to a maximum overlapping classification in which all overlappings that are equal to or higher than the threshold have the same overlapping classification. It is also possible to operate on the basis of a maximum change or rate of change.

Numerous overlappings can be modeled and/or determined along the vehicle's movement path, which can occur at different times or different locations. The extent of overlapping can indicate the amount of overlapping or the amount of change in the overlapping. The change can be determined as a temporal derivation of the overlapping.

In some variations, the parameterization can represent the severity of the collision with regard to vehicle damages and/or personal injury. The parameterization can relate in general to the first vehicle and/or the other object participating in the collision. The parameterization can also represent the survival probability of one or more passengers, severity of injury to a passenger, penetration depth of the vehicle to the other object in the collision, and/or the probability of recoil, and/or direction of a recoil, during the collision. This parameterization can form the basis in particular for subsequent vehicle control.

In particular, the parameterization and/or modeling of the collision, and/or overlapping, and/or modeling of the relative movement can also be based on, and/or determined with, sensor data. Sensors can be placed on the vehicle in question for this. This results in parameterization based on current circumstances. Sensors can be configured to monitor speed, acceleration, movement or relative movement, or deformation of the vehicle.

The first outline and/or second outline can be based on subsection outlines. This results in higher resolution and/or greater prioritization of parts of the vehicle that are more critical in a collision. In particular, the first outline can be broken down into subsection outlines. These subsection outlines can relate to functional units and/or components of the vehicle and/or an object. The parameterization can be based on an overlapping of the subsection outlines, with respect to either the area and/or lines. The parameterization can also relate to information regarding the vehicle interior, e.g. the presence or absence of people within a subsection outline. Different subsection outlines can overlap to different extents, depending on the relative movement and/or the second outline. In general, the parameterization and/or extent of overlapping can be based on different weightings of different subsection outlines, relating to different stiffnesses, and/or danger levels, and/or the presence of people, and/or energy absorption, and/or deformability, and/or the extent to which something is prone to damage.

The relative movement can represent a movement unaffected by the collision. This allows for a simple processing in which the overlapping offers a good means of estimating the parameterization, in particular regarding the severity of the collision. A change in direction and/or speed can also be accounted for in the collision if there is enough information and/or data for such a consideration. It is also possible that the vehicle and/or other object in the collision will not become deformed during the collision. The determination of the extent of overlapping, e.g. the overlapping, maximum overlapping, or maximum change in overlapping, can be simplified in this manner.

In general, the first vehicle can be controlled with the parameterization and/or one or more signals or data representing the parameterization can be provided thereto. This can take place in particular prior to the collision. The control can comprise controlling and/or triggering one or more functions in the vehicle. These functions can relate to collision mitigation with a collision avoidance system or collision avoidance functionality. The functionality can relate to active or passive systems for occupant safety, such as activating airbags, tightening seat belts, a warning device inside or outside the vehicle, brakes, an anti-lock braking system, a lane keep assist, shock absorber control, a drive unit, a transmission, suspension control, and/or differential control. A signal or data can be provided that relates to this functionality. A functionality can be assigned to a specific device or assembly in the vehicle, and/or it can be provided by a corresponding vehicle system.

There is also a processing unit, which is configured to execute and/or control the method described herein. The processing unit can be designed for use in a vehicle, in particular in the first vehicle. By way of example, the processing unit can be installed or implemented in a control box for a vehicle, or it can form the control box.

In another embodiment, the processing unit can be outside the vehicle and designed to communicate with and/or provide information to a vehicle system. The processing unit can contain one or more signal and/or data interfaces, and/or vehicle or vehicle function control interfaces, and/or interfaces for receiving sensor data.

The present disclosure also relates to a vehicle with the processing unit described herein.

A computer program with program code is also part of the present disclosure, which controls and/or executes the method described herein on a processing unit.

A vehicle collision can be a future and/or probable future, and/or possible future vehicle collision, and/or a vehicle collision in a scenario stored in a prognosis function and/or traffic monitoring function; these functions can be provided in the first vehicle, or provided externally and communicated thereto through a wireless interface.

An outline can represent a two-dimensional or three-dimensional model of the object, either the vehicle or the other object participating in the collision. In particular, the outline can indicate a width and length of the vehicle or object, and/or the shape thereof. In a three-dimensional illustration, it can also indicate the height and/or vertical contour. The outline can be rectangular or cubical, or it can illustrate the shape of the object more precisely with a specific resolution. Outline data can be stored for the first vehicle in particular, based on which an outline of the vehicle can be produced that is similar to the actual outline of the vehicle. An outline can represent the general outline and/or outer surfaces and/or outer contours and/or outer walls of the object. A subsection outline can contain lines or areas that are modeled within the object.

The first vehicle can be a motor vehicle such as a passenger automobile or truck, or it can be a commercial vehicle and/or utility vehicle, and/or an electric vehicle, in particular a highly automated vehicle that is equipped with numerous environmental sensors. These vehicles are particularly suited for advanced control systems. The collision participant can be another vehicle, a stationary object such as a building or tree, or a moving object such as one or more pedestrians.

The outline of the collision participant can be based on sensor data that can represent the speed and/or direction, and/or shape of at least part of an outline. An outline can be obtained with radar or lidar data, which indicate the width and/or height and/or depth of the collision participant, as well as the speed thereof based on the doppler effect. Video or image data can also be used to determine an outline, e.g. in conjunction with a database that assigns images of vehicles and/or objects to corresponding outline data. An outline can define an interior space within the outline such as an interior area, or a cross section or inner volume, to obtain a three-dimensional model.

A modeling of an object and/or procedure can comprise the representation and/or estimation of the modeled object or procedure through a mathematical depiction and/or through a simulation and/or through a processing unit, in a digital and/or computerized form. This modeling can allow for substantial simplifications.

A relative movement can represent the movement between the other object participating in the collision and the first vehicle, and/or between the first outline and the second outline. The relative movement can be modeled and/or represented in numerous discrete time increments or points in time. It is understood that a specific movement can be transformed into another movement through simple mathematic transformations. Both collision participants are moving in an external inertia system, while in the inertia system of one of the collision participants, only the other participant is moving. The first and second outlines can overlap along at least a portion of the relative movement in which an overlapping occurs in at least one or more of the points in time and/or time increments. In general, the relative movement can be based on the speeds and/or directions of movement of the participants in the collision when the collision takes place, based on an actual determination and/or calculation and/or projection of these speeds and/or directions within a traffic situation.

The collision can be modeled on the basis of an overlapping and/or extent of overlapping for one or more time increments. In particular, the modeling can comprise moving the outline along a path corresponding to the relative movement. The relative movement, comprising speed and/or direction, can remain constant during the collision, without taking the effects of the collision into account.

Overlapping can comprise at least a partial overlapping of outlines and/or the interiors of outlines, in particular the areas, and/or intersections of one or more outline segments of the first vehicle with one or more outline segments of the other object. The overlapping can define an area and/or length of overlapping that can be represented and/or indicated by the overlapping portion in relation to the overall area and/or length.

The extend of overlapping can represent the portion of overlapping. An overlapping area can be the surface area representing where the outlines overlap and/or the area contained within the overlapping region. An overlapping length can correspond to the length of the lines encompassing and/or defining an overlapping area and/or overlapping region. An overlapping volume can correspond to a volume occupied by both the vehicle and the other object at the same time. This assumes that both the vehicle and the other object will penetrate one another.

The parameterization can be determined in particular through mapping of the extent of overlapping on the severity of the collision. The severity can be represented by a classification within a severity classification system, e.g. AIS98 and/or Sim CS. In general, the parameterization can comprise classification of the severity based on maximum overlapping and overlapping increase.

The sensor data can represent one or more operating parameters for the first vehicle and/or the other object, and/or one or more environmental parameters. Operating parameters can comprise, be, or represent the speed, and/or direction or movement, and/or acceleration or braking, and/or acceleration potential and/or braking potential, and/or vehicle geometry, e.g. width and/or height and/or length and/or shape, and/or weight and/or load, and/or tire pressure and/or the condition of the brakes, and/or the presence of one or more people.

Environmental parameters can relate to other vehicles and/or obstacles and/or the operating parameters thereof, and/or a building, and/or weather, and/or the nature of the ground surface, and/or visibility, and/or surface friction in the case of rain and/or snow. Sensor data regarding the first vehicle can be obtained from sensors in the first vehicle such as speed sensors and/or torque sensors and/or location sensors and/or directional sensors and/or load sensors, and/or air pressure sensors, and/or people sensors, and/or acceleration and/or braking sensors.

Sensor data regarding the other collision participant and/or the environment can come from or be provided by sensors dedicated thereto, and sent via wireless transmission. The sensor data for the other collision participant and/or the environment can also come from sensors in the first vehicle, which can comprise active and/or passive sensors, and/or radar, and/or lidar, and/or ultrasonic sensors, and/or optical or infrared sensors, i.e. from one or more cameras. There can also be different types of operating parameters for different objects participating in the collision or in the environment. By way of example, there may be sensor data for the first vehicle that are not available for other vehicles because they have not been transmitted. In some cases, one or more operating parameters can come from a memory dedicated to the first vehicle, containing a database in which substantially fixed parameters can be stored.

The processing unit can be configured to execute the method described herein in its entirety or in part. The processing unit can comprise a programmable microcomputer or microcontroller, or a processing circuit and/or a memory, and the method can be in the form of a computer program containing programming code. The computer program can be stored on a computer-readable data storage medium. Features or advantages of the method can be applied to the device or vice versa.

The present disclosure shall be explained in greater detail below in reference to the drawings.

DETAILED DESCRIPTION

Figure 1:
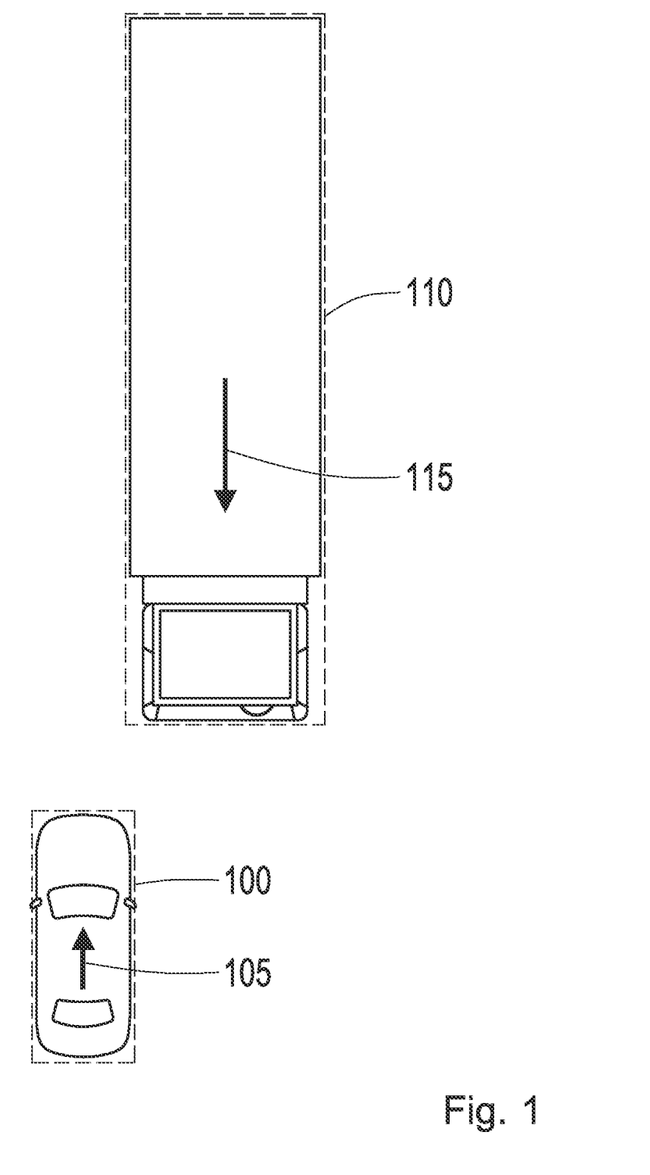
FIG. 1 shows an exemplary collision scenario.

FIG. 1 shows an exemplary collision scenario in which a first vehicle with a first outline 100 and a first speed vector 105 and a second vehicle as an example of a collision participant with a second outline 110 and a second speed vector 115 move toward one another. The first outline 100 of the first vehicle is clearly narrower and shorter than that of the second vehicle in this example, as would be the case with a passenger automobile and a truck. The outlines could also be substantially the same size, as would be the case with vehicles of the same or comparable sizes.

Figure 2A:
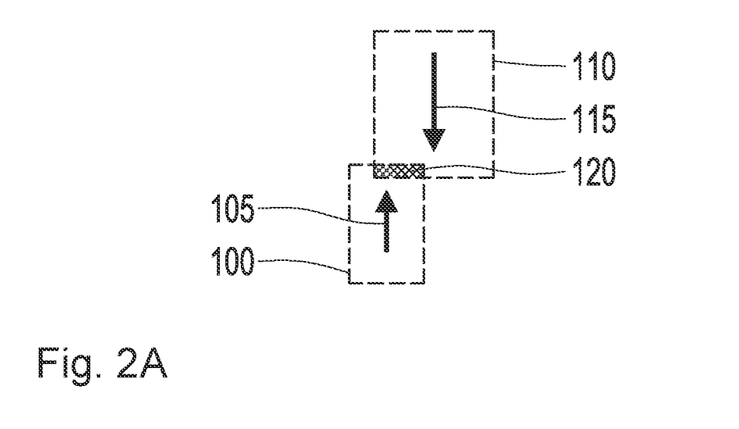
FIGS. 2A, 2B, and 2C show different points in time in an exemplary collision modeling.
Figure 2B:
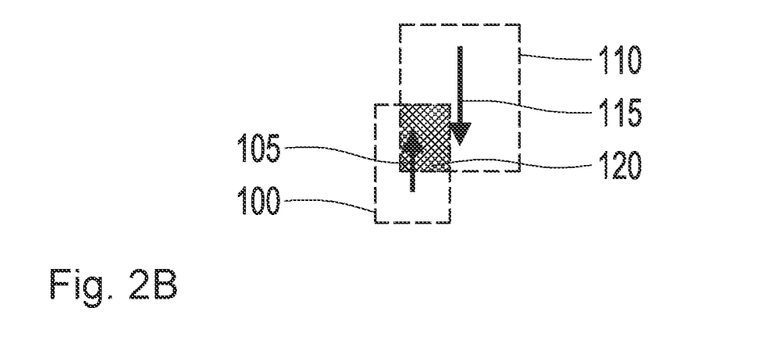
Figure 2C:
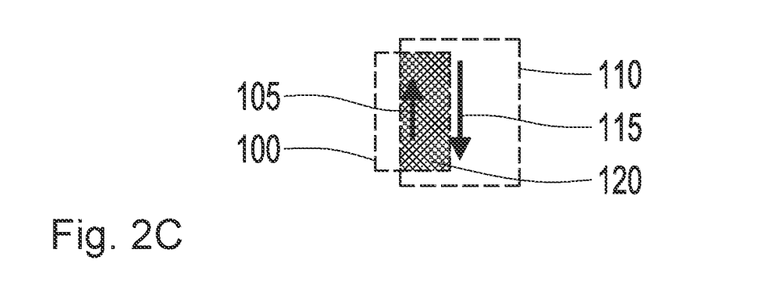

FIGS. 2A-C show a schematic illustration of different times in a modeling of a collision, when the collision participants overlap with their first outline 100 and second outline 110 in an overlapping region 120.

The overlapping region 120 is a different size at different times. FIG. 2A shows the point in time right after the start of the collision, when the overlapping region 120 is still small. FIG. 2B shows a later point in time, when the overlapping region 120 has increased in size. FIG. 2C shows an even later point in time, when the overlapping region 120 has reached its maximum size during the collision. There can be numerous points in time with the maximum overlapping, depending on the outlines 100, 110 and the speeds.

The extent of overlapping for any of the points in time can be indicated by the area of the overlapping region 120, and/or the lengths of the lines surrounding and/or defining the overlapping region 120. If the vehicles are seen in three-dimensional space, the overlapping region 120, which is filled by both vehicles simultaneously, can be regarded as a volume. A change over time of the overlapping region 120, i.e. the volume, the area, or the length of the lines, can also be regarded as the extent of the overlapping.

Figure 3A:
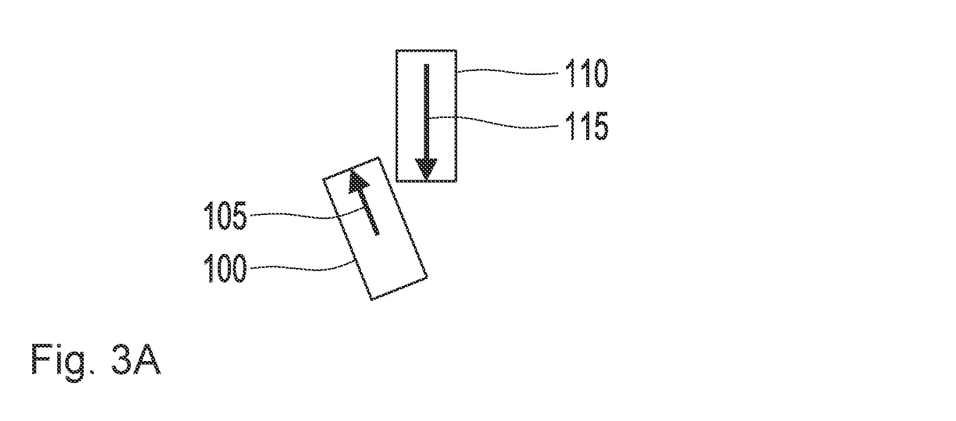
FIGS. 3A, 3B, and 3C show different points in time in another exemplary collision modeling.
Figure 3B:
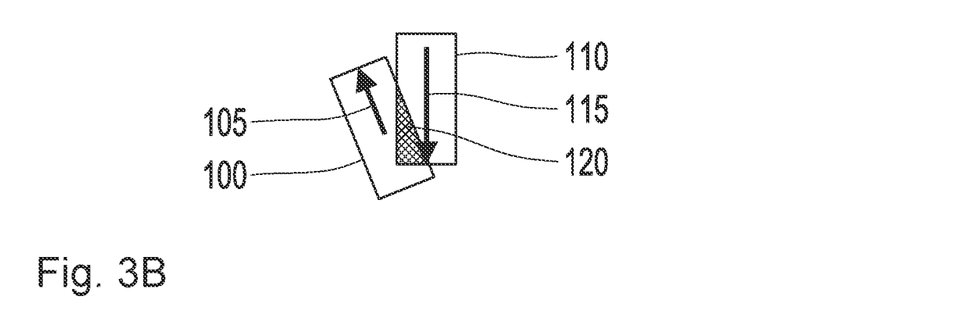
Figure 3C:
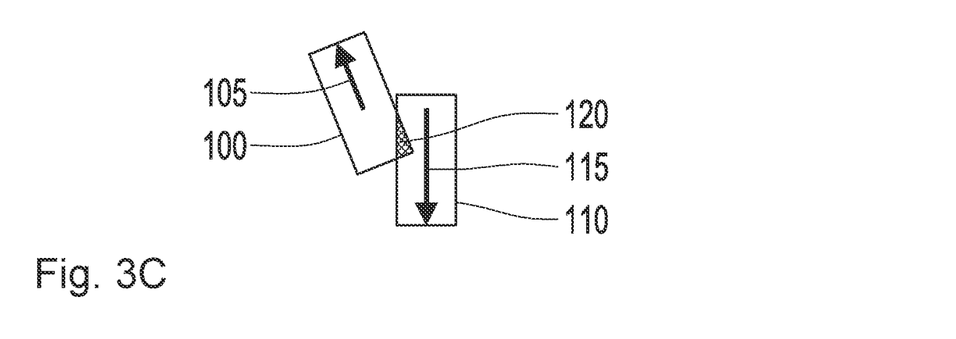

FIGS. 3A-C show a schematic illustration of different times in the modeling of a collision in another scenario, in which the vehicles do not drive directly toward one another, but instead collide at an angle indicated by their speed vectors 105, 115. The collision has not yet occurred in FIG. 3A; this point in time can be part of the modeling of the collision, or the modeling can start at the point in time when an overlapping, or collision, has already occurred in the modeling. A slightly angled collision has already occurred in FIG. 3B. FIG. 3C shows an even later point in time. The greatest overlapping takes place in FIG. 3B in this example.

Figure 4:
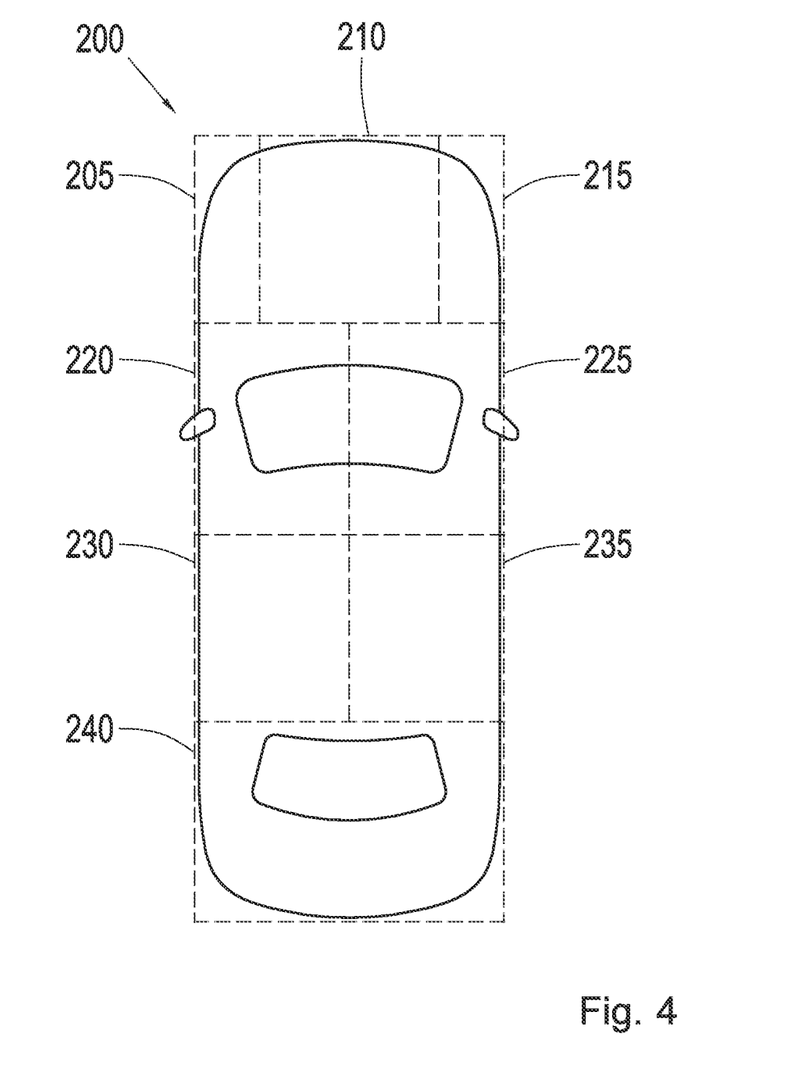
FIG. 4 shows exemplary subsection outlines.

FIG. 4 shows an exemplary outline 200 of a vehicle composed of subsection outlines. In this example, there is a subsection outline 205 for the left front wheel, a subsection outline 210 for the engine compartment, and a subsection outline 214 for the right front wheel. There is also a subsection outline 220 for the driver's seat, and a subsection outline 225 for the front passenger seat, as well as the back seat sections 230, 235. There is a subsection outline 240 for the trunk at the rear, which can also comprise the rear wheels.

The different subsection outlines 205-240 can be weighted differently when determining an overlapping extent, e.g. according to their functions, and/or weights, and/or danger levels, and/or structure, and/or strength, and/or general structural properties of the vehicle structure regarding energy absorption and/or deformation. The weight and/or weighting can be based on sensor data and/or other information. A subsection outline containing a person can be given a higher weight and/or higher weighting than when the subsection outline is unoccupied. Different vehicles can have different subsection outlines and/or associated functions and/or weights.

Figure 5:
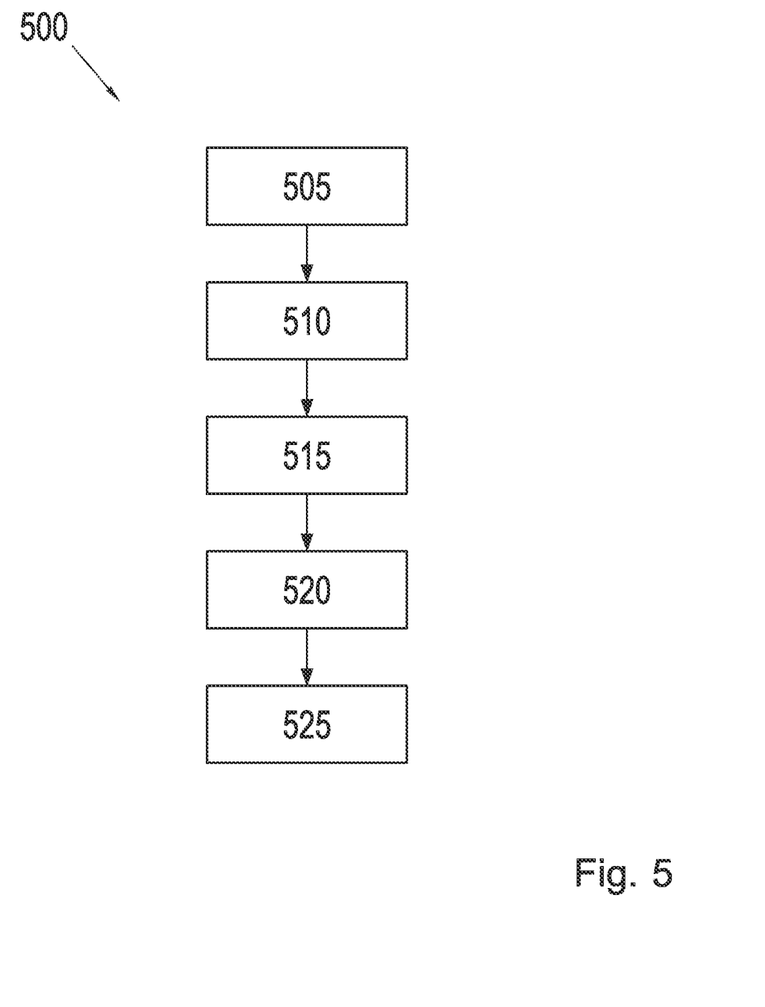
FIG. 5 shows a flow chart for an exemplary method.

FIG. 5 shows a flow chart for an exemplary method 500. The method 500 can be carried out immediately before an upcoming or pending collision between a first vehicle and a second object participating in the collision. A potential parameterization of the collision can be estimated at this point, which can be used to minimize or mitigate the possible consequences of the collision. The method 500 can also be used in the framework of a simulation to obtain a parameterization of a specific collision scenario. The parameterization can be used to improve the design safety of the first vehicle, e.g. during the development process for the first vehicle.

A first outline of a first vehicle can be obtained in the first step 505. This can include numerous subsection outlines. A second outline of a potential second collision participant can be obtained in the second step 510. These steps 505, 510 can also be carried out in the reverse order and/or simultaneously.

A collision can be modeled in the next step 515. This can be a modeling of the relative movement between the participants in the collision and/or their outlines, e.g. outlines 100, 110. During at least part of the movement, there is at least a partial overlapping of the outlines. An extent of overlapping can be determined for one or more points in time in which there is an overlapping. In particular, a maximum overlapping, i.e. a maximum overlapping volume, maximum overlapping area, and/or maximum overlapping line length, can be determined.

Moreover, a maximum overlap increase can be determined as the maximum change. The extent of overlapping can be based on the overlapping area and/or change, in particular the maximums thereof, in which a weighting can be taken into account, and/or in which the extent of overlapping can be based on a weighting. The weighting can be based on subsection outlines, and/or functions, and/or the range in speed of the relative speed, and/or the direction of the collision. In particular, the overlapping extent of a sideways collision or rear end collision can be weighted differently (lower) than a frontal collision, although a sideways collision impacting a space occupied by a person, i.e. the driver's seat or front or rear passenger seats, can be weighted higher.

A parameterization can be obtained on the basis of the extent of overlapping in the next step 520. This can comprise plotting the extent of overlapping onto a parameterization. In particular, the severity of a collision can be determined on the basis of a severity classification and/or one or more threshold values. A first threshold value and/or a first group of threshold values can relate to the maximum overlapping, for example, and/or a second threshold value and/or second group of threshold values can relate to a maximum change.

A threshold value and/or threshold value group can be calculated and/or determined from simulations and/or experiments. Threshold values and/or threshold value groups can be specific to a vehicle and/or typical for a vehicle type or model. A threshold value group can contain numerous threshold values, which can be categorized according to their values, and/or relate to the different subsection outlines and/or different collision directions. There can therefore be different threshold values for sideways and/or rear end and frontal collisions.

The vehicle can then be controlled on the basis of the parameterization in the last step 525. Signals or data can also be sent to the vehicle components at this point. In particular, one or more crash avoidance or mitigation systems can be activated on the basis of the parameterization, i.e. airbags and/or seat belt tighteners, and/or seat functions.

The severity of a collision can be classified according to AIS98 or SimCS:

| AIS98 | Injury Severity | SimCS |
|---|---|---|
| 0 | Uninjured | 1 |
| 1 | Slight | 2 |
| 2 | Serious | 2 |

-continued

| AIS98 | Injury Severity | SimCS |
|---|---|---|
| 3 | Severe | 2 |
| 4 | Very severe | 3 |
| 5 | Critical | 3 |
| 6 | Maximum (untreatable) | 3 |

An extent of overlapping can be mapped on the basis of this type of parameterization of the severity, and/or the vehicle can be controlled accordingly.

A severity classification based on the extent of overlapping, which takes the maximum overlapping and maximum increase in overlapping into account, can be classified as follows:

|  | Low maximum overlapping | High maximum overlapping |
|---|---|---|
| Low maximum increase | Probably no injury, superficial vehicle damage expected; SimCS: 1 | Significant damage to vehicle; SimCS: 2 |
| High maximum increase | Slight injuries, significant damage to vehicle; SimCS: 2 | Serious or fatal injuries; Substantial damage to vehicle; SimCS: 3 |

A threshold value for the maximum overlapping can be selected such that an overlapping area or overlapping length of N1% or more is classified as "high," or maximum overlapping, where N1 can be 20, 25, or 30. If the overlapping is lower, it can be classified as "low."

An increase can be determined in particular with regard to adjacent time increments. The increase can relate in general to the increase in overlapping, i.e. an overlapping area and/or line length, in relation to the overall area and/or overall line length of an outline, in particular the first outline. The increase can be depicted as N2% increase in the overlapping area and/or line length in a time increment, where N2 can relate to the overall area or overall line length of the outline. N2 can be 10 or 15. For N2=10, an increase in the overlapping of 10% or more of the overall area or overall line length of the outline in a time increment between two adjacent time increments is then classified as "high." If the increase in all of the time increments is lower than this, it is classified as "low." N2 can be a function of the relative speed and/or the collision angle.

In general, severity classifications with additional levels and/or threshold values, regarding the overlapping and/or the increase in overlapping, can be used.

The approaches described herein allow for a reliable collision analysis prior to an actual collision. This allows for appropriate preparations to be made. In particular with relatively low speeds, it is possible to react appropriately, in that excessive intervention in the vehicle controls and/or interactions with people in the vehicle can be prevented if there is no serious threat of injury.

REFERENCE SYMBOLS 100 first outline of the first vehicle
105 first speed vector
110 second outline of the second vehicle
115 second speed vector
120 overlapping/overlapping extent
200 outline with subsection outlines
205 left front wheel
210 motor compartment
215 right front wheel
220 driver's seat
225 front passenger seat
230 left rear seat
235 right rear seat
240 trunk
500 method
505 modeling an outline of a first vehicle
510 modeling an outline of a second vehicle
515 modeling a collision
520 parameterization on the basis of an extent of overlapping
525 controlling the vehicle on the basis of the parameterization

The invention claimed is:

1. A method for parameterization of a vehicle collision, comprising:
   obtaining a first outline of a first vehicle;
   obtaining a second outline of a second object participating in a collision with the first vehicle;
   modeling the collision between the first vehicle and the second object on a basis of relative movement of the first outline and the second outline, wherein in the relative movement, the first outline and the second outline overlap at least along part of the relative movement; and
   determining parameterization on a basis of an extent of the overlapping of the outlines, wherein the parameterization represents a severity of the collision with respect to vehicle damage and personal injury.

2. The method according to claim 1, wherein the extent of the overlapping is based on overlapping of the lines of the outlines.

3. The method according to claim 1, wherein the extent of the overlapping is based on an area of overlapping of the outlines.

4. The method according to claim 1, wherein the extent of the overlapping is based on a penetration of the outlines.

5. The method according to claim 1, wherein the extent of the overlapping corresponds to a maximum overlapping and/or a change in the overlapping over time.

6. The method according to claim 1, wherein the parameterization is based on sensor data.

7. The method according to claim 1, wherein the first outline and/or the second outline are modeled with subsection outlines.

8. The method according to claim 1, wherein the relative movement represents a movement unaffected by the collision.

9. The method according to claim 1, comprising:
   controlling the first vehicle and/or components in the first vehicle on a basis of the parameterization.

10. A device for parameterization of a vehicle collision, comprising:
    a processing device configured to:
       obtain a first outline of a first vehicle;
       obtain a second outline of a second object participating in a collision with the first vehicle;
       model the collision between the first vehicle and the second object on a basis of relative movement of the first outline and the second outline, wherein in the relative movement, the first outline and the second outline overlap at least along part of the relative movement; and
       determine parameterization on a basis of an extent of the overlapping of the outlines, wherein the parameterization represents a severity of the collision with respect to vehicle damage and personal injury.

11. The device according to claim 10, wherein the extent of the overlapping is based on overlapping of the lines of the outlines.

12. The device according to claim 10, wherein the extent of the overlapping is based on an area of overlapping of the outlines.

13. The device according to claim 10, wherein the extent of the overlapping is based on a penetration of the outlines.

14. The device according to claim 10, wherein the extent of the overlapping corresponds to a maximum overlapping and/or a change in the overlapping over time.

15. The device according to claim 10, wherein the first outline and/or the second outline are modeled with subsection outlines.

16. The device according to claim 10, wherein the relative movement represents a movement unaffected by the collision.

17. The device according to claim 10, wherein the processing device is configured to:
control the first vehicle and/or components in the first vehicle on a basis of the parameterization.

18. A vehicle comprising the device according to claim 10.

19. A non-transitory computer readable medium having stored there on a computer program containing programming code what, when executed by a processing device, causes the processing device to execute a method comprising:
obtaining a first outline of a first vehicle;
obtaining a second outline of a second object participating in a collision with the first vehicle;
modeling the collision between the first vehicle and the second object on a basis of relative movement of the first outline and the second outline, wherein in the relative movement, the first outline and the second outline overlap at least along part of the relative movement; and
determining parameterization on a basis of an extent of the overlapping of the outlines, wherein the parameterization represents a severity of the collision with respect to vehicle damage and personal injury.

* * * * *